United States Patent [19]

Ogawa

[11] Patent Number: 4,631,597
[45] Date of Patent: Dec. 23, 1986

[54] VIDEO DATA TRANSMISSION APPARATUS

[75] Inventor: Mutsuo Ogawa, Tokyo, Japan

[73] Assignee: Ricoh Company, Ltd., Tokyo, Japan

[21] Appl. No.: 355,642

[22] Filed: Mar. 8, 1982

Related U.S. Application Data

[63] Continuation of Ser. No. 969,423, Dec. 14, 1978, abandoned.

[30] Foreign Application Priority Data

Dec. 22, 1977 [JP] Japan .................. 52-153581

[51] Int. Cl.$^4$ .............................................. H04N 1/40
[52] U.S. Cl. .................................. 358/258; 340/731; 340/745
[58] Field of Search ............... 358/256, 258, 146, 147; 340/716, 734, 735, 731, 745

[56] References Cited

U.S. PATENT DOCUMENTS

| | | | | |
|---|---|---|---|---|
| 3,659,283 | 4/1972 | Ophir | ................. | 340/731 |
| 3,735,383 | 5/1973 | Waka | ................. | 340/745 |
| 3,928,845 | 12/1975 | Clark | ................. | 340/731 |
| 4,064,389 | 12/1977 | Patterson | ................. | 358/256 |
| 4,149,145 | 4/1979 | Hartke et al. | ................. | 358/280 |

OTHER PUBLICATIONS

Pilz—"Techniques for Transmitting Subtitles—EBUS Review—No. 158, pp. 163–171, Aug. 1976.

Primary Examiner—Joseph A. Orsino, Jr.
Attorney, Agent, or Firm—David G. Alexander

[57] ABSTRACT

A scanning array (12) comprising a plurality of photosensor elements (12a) is reciprocated perpendicular to the axis (12b) thereof to scan a rectangular area of an original document (69). After scanning the area, the document (69) is moved parallel to the axis (12b) of the scanning array (12) and the scanning array (12) reciprocated again to scan a next retangular area. This process is continued until the entire document (69) is scanned.

Codes representing characters indicating the name, address or the like of the transmitting apparatus are stored in read only memories (92), (93), (94), (96). These codes are read out and mixed with the data signals for transmission in such a manner that the name and address are automatically reproduced by the receiving apparatus at the top of the reproduction. The code signals may be superimposed on the data signals or, preferably, transmission of the data signals is inhibited while the codes are being transmitted. Frequency division of scan clock pulses allows the codes to be reproduced in enlarged form. The name and address may be changed merely by replacing the memories (92), (93), (94), (96) with new memories in which the new desired name and address codes are stored. The memories (92), (93), (94), (96) are in the form of integrated circuits which plug into a circuit board (211), the positions of the memories (92), (93), (94), (96) on the circuit board (211) corresponding to the positions of the character codes stored therein as reproduced.

21 Claims, 21 Drawing Figures

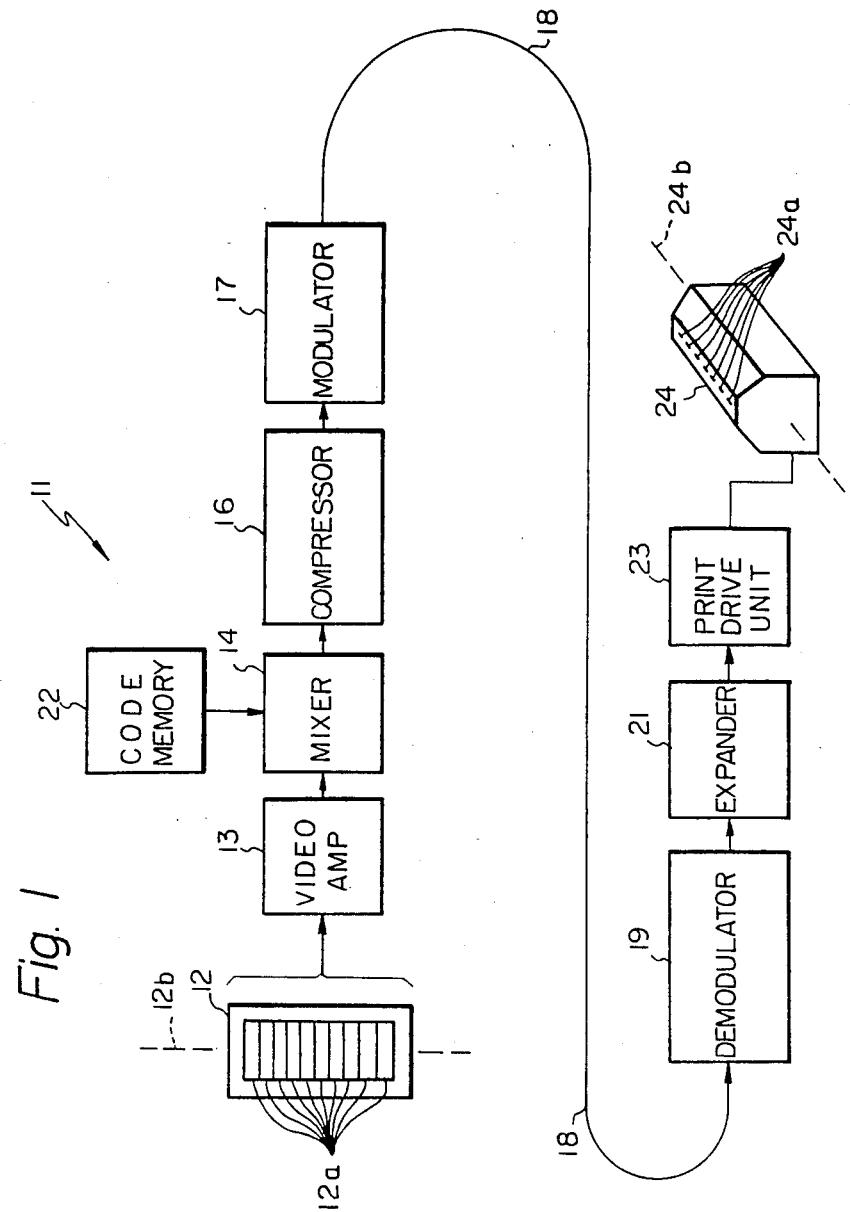

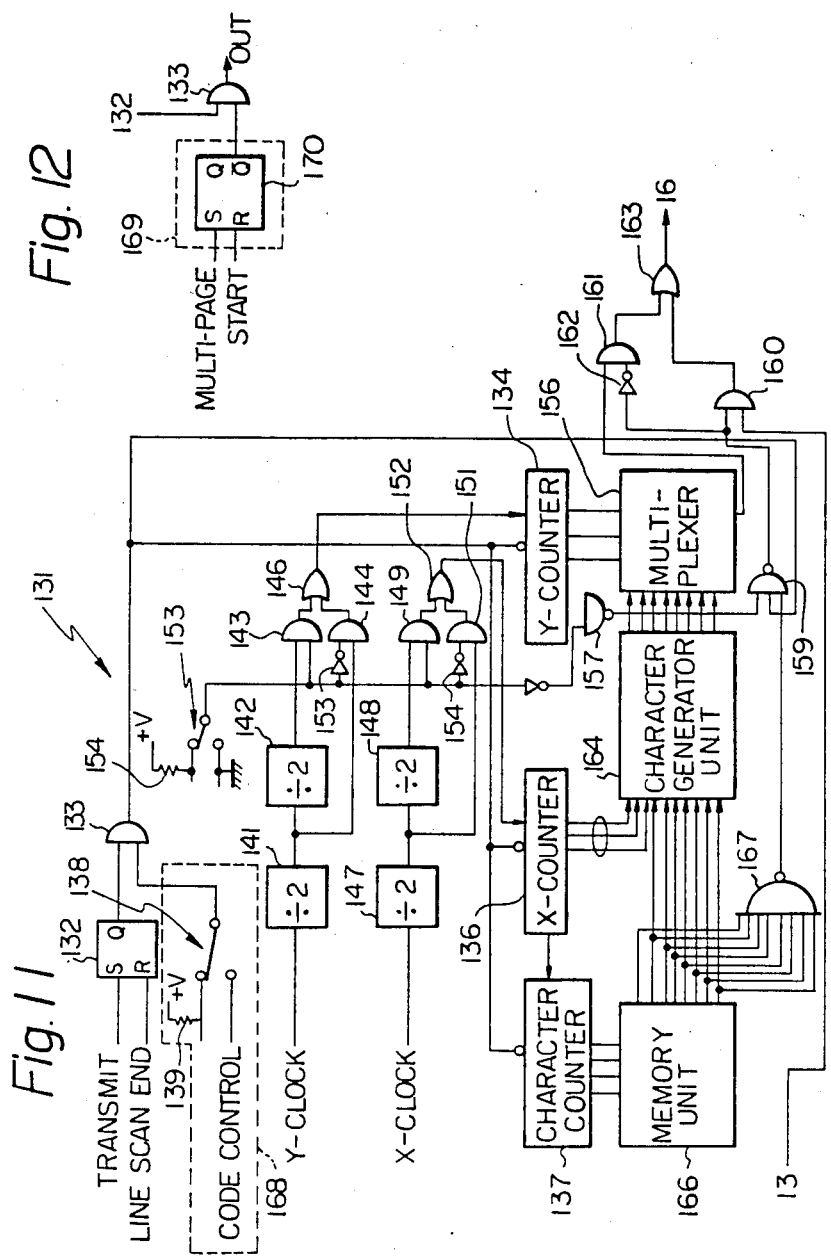

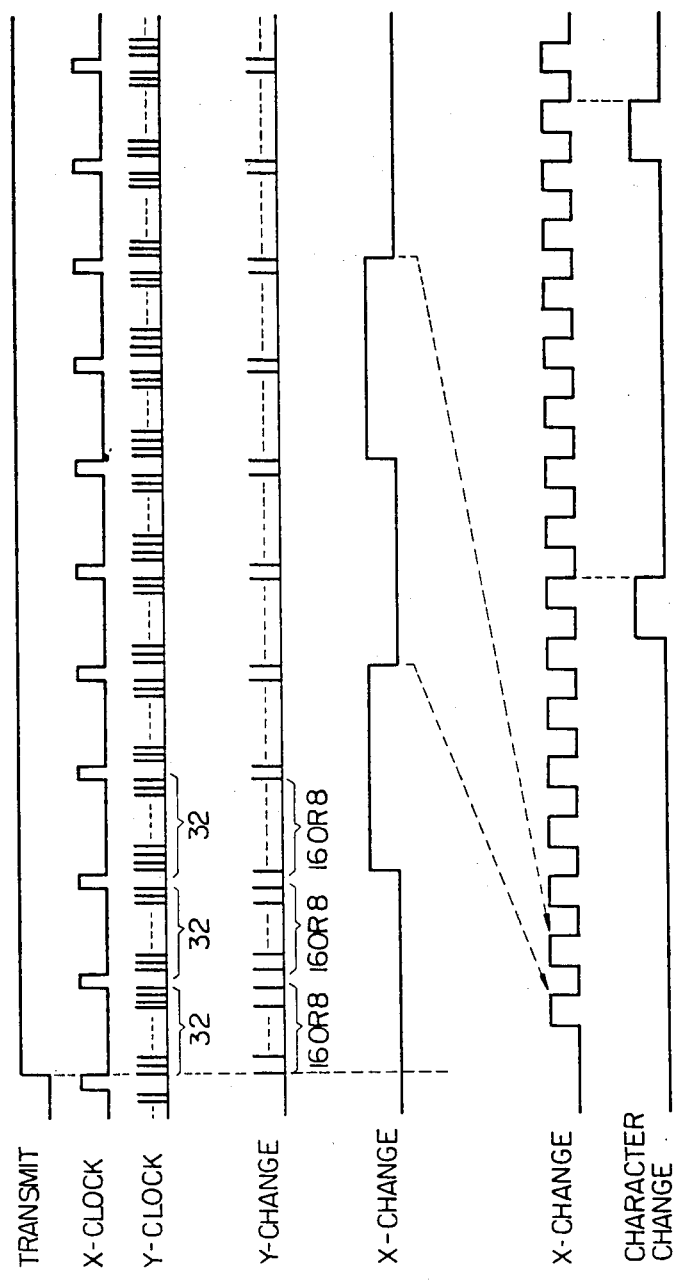

VIDEO DATA TRANSMISSION APPARATUS

CROSS REFERENCE TO RELATED APPLICATION

This application is a continuation of copending U.S. patent application Ser. No. 969,423, filed Dec. 14, 1978 now abandoned.

BACKGROUND OF THE INVENTION

The present invention relates to a video data transmission apparatus for use in a facsimile transceiver or the like comprising means for automatically transmitting the name and address of a transmitting apparatus to a receiving apparatus for reproduction without alteration of the receiving apparatus.

In the present type of facsimile transceiver a scanning array which is typically of the charge-coupled-device (CCD) type comprises 32 photosensor elements arranged along a linear axis. The array is reciprocated perpendicular to the axis thereof to scan a rectangular portion of an original document. The photosensor elements produce sequential output data signals corresponding to incident light. After each photosensor element produces a data signal, the array is moved by an incremental distance perpendicular to the axis of the array and the photosensor elements controlled to each produce another data signal output. After each reciprocation of the array, the document is moved parallel to the axis of the array and the array reciprocated again to scan another rectangular area of the document. This process is repeated until the entire document is scanned.

The data signals are subjected to run length compression and transmitted to a remote transceiver which reproduces the original document in response to the signals. The compressed data signals are expanded at the receiving transceiver and applied to a printing array comprising 32 printing elements such as electrodes which is moved in the same pattern as the scanning array to print the image pattern on a sheet of paper. Typically, the printing elements will induce an electrostatic charge pattern on the paper which represents the document. A toner substance is applied to the paper to develop the electrostatic image into a toner image which is fixed to the paper to provide a permanent reproduction of the original document.

In facsimile transmission it is often desired to print the name, address or the like of the originating or transmitting apparatus on the facsimile which is reproduced by the receiving apparatus. Not only does this allow personnel at the receiving apparatus to know the origin of the facsimile, but provides a permanent record of the originator on the facsimile itself for future reference.

A simple method of accomplishing this object is to print the name and address of the transmitting facility in a marginal area of the original document to be transmitted. Another expedient is to provide pre-printed forms containing the name and address of the originating facility on which the information to be transmitted is typed or attached.

The first expedient is impractical from a personnel point of view since it is troublesome to print the required information on each document to be transmitted and many operators will simply not do so unless strictly disciplined by management. Also, it is undesirable to print such information on valuable original documents.

The second expedient is also impractical because many original documents are not compatible in size with pre-printed forms and also because it is difficult to supply pre-printed forms of various sizes to all personnel who prepare documents for facsimile transmicsion.

SUMMARY OF THE INVENTION

A video data transmission apparatus embodying the present invention includes scanning means for producing electrical data signals representing a visual image such as an original document and transmission means for transmitting the data signals. Memory means store character code signals representing the name and address or the like of the transmitting apparatus. Mixing means read the code signals out of the memory means and mix the code signals with the data signals for transmission by the transmission means.

The name and address of the transmitting apparatus are automatically reproduced at the top of the facsimile copy at the receiving apparatus. No modification to the receiving apparatus is required since the code signals are received in the same form as the data signals.

It is an object of the present invention to provide a video data transmission apparatus for use in a facsimile transceiver or the like which enables automatic transmission of characters identifying the transmitting apparatus and reproduction of the characters by the receiving apparatus.

It is another object of the present invention to provide a video data transmission apparatus which allows changing the characters merely by changing an integrated circuit memory.

It is another object of the present invention to transmit identification characters in a facsimile system using simple and low cost circuitry.

It is another object of the present invention to provide a video data transmission apparatus which may be manufactured economically using commercial production technology.

It is another object of the present invention to provide a generally improved video data transmission apparatus.

Other objects, together with the foregoing, are attained in the embodiments described in the following description and illustrated in the accompanying drawing.

BRIEF DESCRIPTION OF THE DRAWING

FIG. 1 is a block diagram of a video data transmission apparatus embodying the present invention;

FIG. 11 is a block diagram of a second embodiment of the present apparatus;

FIG. 12 is a block diagram of an alternative transmission control means of the embodiment of FIG. 11;

FIG. 13 is a timing diagram of the embodiment of FIG. 12;

DESCRIPTION OF THE PREFERRED EMBODIMENTS

Figure 2A:
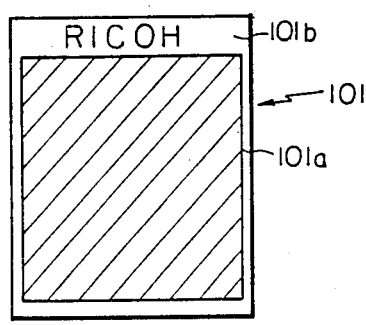
FIGS. 2a to 2e are diagrams illustrating the operation of the present apparatus.

While the video data transmission apparatus of the present invention is susceptible of numerous physical embodiments, depending upon the environment and requirements of use, substantial numbers of the herein shown and described embodiments have been made, tested and used, and all have performed in an eminently satisfactory manner.

Referring now to FIG. 1 of the drawing, a video data transmission apparatus embodying the present invention is here shown as being in the form of a facsimile transceiver which is generally designated by the reference numeral 11 and comprises a charge-coupled-device (CCD) linear scanning array 12. The array 12 comprises typically 32 photosensor elements, designated as 12a, although only a few elements 12a are illustrated to avoid cluttering of the drawing. The elements 12 are arranged along an axis 12b.

For scanning an original document, the array 12 is moved perpendicular to the axis 12b in a reciprocating manner. Where the line scanning density is eight lines per millimeter, the length of the array 12 is 4 mm. Taking for example an original document of A4 size, the axis 12b of the array 12 is aligned in the length direction of the document. The array 12 is moved from the left edge of the document by a distance of 216 mm to the right edge thereof and then returned to the left edge of the document. In other words, the array 12 is moved in the width direction of the document. During the rightward of scanning movement of the array 12 the elements 12a are enabled to produce data signals corresponding to incident light thereon from the document corresponding to light and dark areas thereof.

Although the array 12 may be embodied by discrete phototransistors, photodiodes or the like or a multiplexed array of such elements, in the present example the array 12 is a CCD device and the elements 12a are sequentially enabled or strobed by Y-scan clock pulses to produce outputs. During rightward or scanning movement of the array 12 the elements 12a are sequentially enabled or self-scanned by the Y-clock pulses to produce data signals corresponding to a vertical line 4 mm long on the document. Then, the array 12 is moved rightwardly by $\frac{1}{8}$ mm in synchronism with an X-scan clock pulse and the elements 12a sequentially enabled again to produce data signals corresponding to a vertical line 4 mm long spaced rightwardly of the previous vertical line by $\frac{1}{8}$ mm. This process is repeated 1728 times during each rightward movement of the array 12 to produce 55,296 data signals representing an area 4 mm long and 216 mm wide on the document. After the array 12 has been returned to its leftmost position or during leftward movement thereof, the document is moved vertically (parallel to the length direction of the document and the axis 12b of the array 12) by a distance of 4 mm, which is equal to the length of the array 12. Then, the array 12 is moved rightwardly to scan another 4 mm×216 mm area of the document which is vertically adjacent to the previous area. This process is repeated until the entire document has been scanned. Taking another exemplary case in which the original document is B4 size, each scanning area will be 4 mm×256 mm. In other words, the array 12 will be enabled to produce data signals and moved incrementally rightwardly 2048 times during each rightward movement of the array 12 to produce a total of 65,536 data signals.

The data signals are produced serially and fed through a video amplifier 13 which quantizes the data signals from analog to digital form into a mixer 14.

The data signals are fed from the mixer 14 and run length encoded by a compressor 16. The run length encoding process is well known in the art and is not the subject matter of the present invention. It is sufficient for an understanding of this invention to know that run length encoding is performed to compress the data and thereby decrease the transmission time. The compressed data signals are fed from the compressor 16 to a modulator 17 which mixes the data signals with a carrier wave and transmits the modulated carrier wave to a remote transceiver via a communication link 18 such as a public telephone line.

The transceiver 11 further comprises a demodulator 19 for demodulating data signals transmitted to the transceiver 11 from a remote transceiver via the link 18. The demodulated data signals are fed to an expander 21 which performs run length decoding on the data signals. The run length decoding process is the reverse of the run length encoding process. The expanded data signals are applied to a print drive unit 23.

The data signals are fed from the print drive unit 23 to a printing array 24 which comprises 32 printing elements 24a arranged along an axis 24b. The array 24 is moved relative to a sheet of printing paper in a manner identical to the array 12 to print a pattern on the paper corresponding to the received data signals and thereby produce a hard copy of an original document scanned by the remote transceiver. The printing elements are typically electrodes which apply electrostatic charges to the paper. A toner substance is applied to the paper to develop the electrostatic pattern or image into a toner image. The toner image is fixed to the paper to provide a permanent facsimile reproduction.

Figure 3:
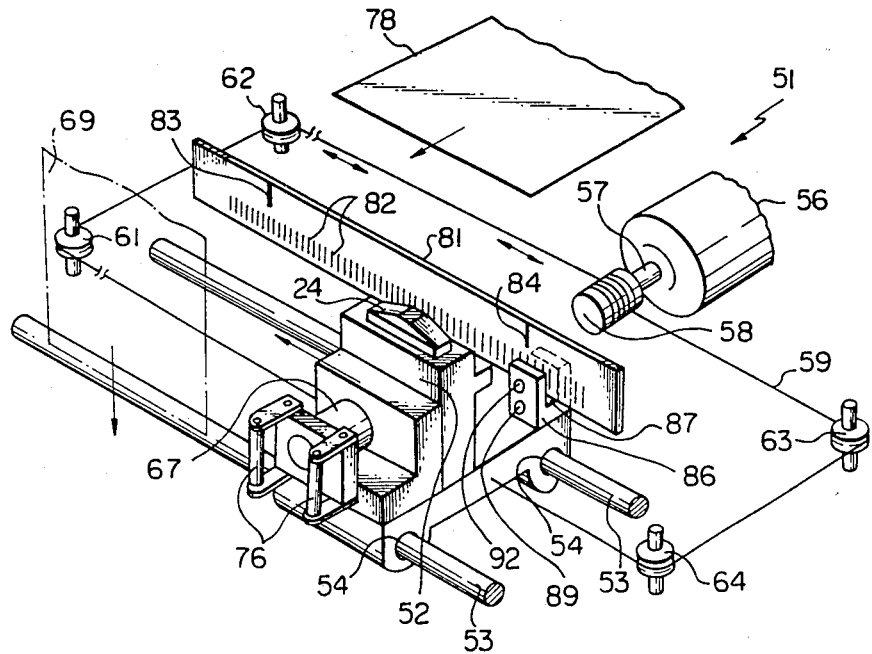
FIG. 3 is a perspective view of a scanning and printing means of the present apparatus.
Figure 4:
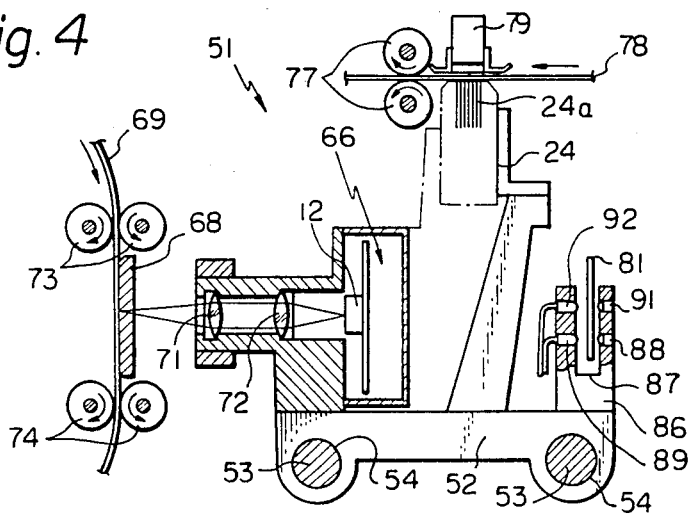
FIG. 4 is a sectional view of the scanning and printing means.

Referring now to FIGS. 3 and 4, a combination scanning and printing head is generally designated as 51 and comprises a block 52 which is slidably supported for linear movement by rods 53 which pass through bores 54 formed through the lower portion of the block 52. The block 52 is driven for reciprocating linear movement from a servo motor 56 having a rotary shaft 57 on which is fixed a cylindrical spool 58. A cable or wire 59 is connected at its opposite ends to the opposite ends of the block 52 respectively and is trained around pulleys 61, 62, 63 and 64. The wire 59 is further wound around the spool 58 several times. Although not shown, a tension means may be provided to maintain the wire 59 taut and prevent it from slipping on the spool 58.

Figure 5:
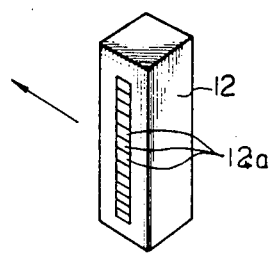
FIG. 5 is a perspective view of a scanning array of the apparatus.

As best seen in FIGS. 4 and 5, the scanning array 12 is mounted in a light-tight chamber 66 formed in the block 52. The chamber 66 opens through a tube 67 toward a transparent platen 68. Presser means (not shown) resiliently press an original document 69 against the platen 68 with the image bearing surface of the document 69 facing the tube 67. Converging lenses 71 and 72 focus a light image of part of the document 69 onto the array 12, the lenses 71 and 72 being fixedly mounted in the tube 67. The axis 12b of the array 12 is oriented vertically as viewed in FIG. 4. Feed rollers 73 and 74 are provided to feed the document 69 downwardly by incremental distances of 4 mm as will be described in detail below. Further illustrated are lamps 76 which are fixedly mounted at the end of the tube 67 for illuminating the document 69 through the platen 68.

Figure 6:
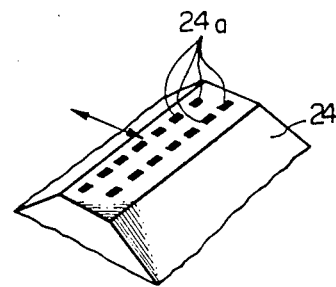
FIG. 6 is a perspective view of a printing array of the apparatus.

The printing array 24 which is shown in FIG. 6 is fixedly mounted on top of the block 62. Feed rollers 77 feed a sheet of printing or copy paper 78 which constitutes a printing surface over the array 24 in increments of 4 mm. A presser 79 presses the paper 78 into engagement with the array 24. As viewed in FIG. 4, the rollers 77 feed the sheet 78 leftwardly and the axis 24b of the array 24 is oriented horinzontally.

Fixedly mounted adjacent to the block 52 is a clock plate 81. The plate 81 is elongated parallel to the axes of the rods 53 and is formed with a lower pattern of alternating opaque and transparent or translucent areas. The opaque areas are designated as clock marks 82 and are formed at intervals of $\frac{1}{8}$ mm (there are 8 clock marks 82 per millimeter). Although only a few of the marks 82 are labeled in the drawing, there are 1728 marks 82 formed on the plate 81 between a left edge mark 83 and a right edge mark 84. In addition, there are a number of marks 82 leftward and rightward of the marks 83 and 84 respectively. The plate 81 may be formed by a photographic process, etching, etc.

Further fixedly mounted on the block 52 is a sensor mount block 86 formed with an elongated vertical slot 87. The inner walls of the slot 87 embrace the clock plate 81 without touching the same. A lower light source 88 such as a light emitting diode and a lower photosensor 89 such as a phototransistor or photodiode are mounted on the right and left walls of the slot 87 as viewed in FIG. 4 at the level of the marks 82. An identical upper light source 91 and photosensor 92 are mounted on the right and left walls of the slot 87 at the level of the marks 83 and 84.

The sensors 89 and 92 produce electrical signals corresponding to the intensity of light transmitted through the clock plate 81.

For transmission, the block 52 is moved to a leftmost position as viewed in FIG. 3 and the document 69 is positioned by the rollers 73 and 74 so that an uppermost portion thereof is pressed against the platen 68 at the axis of the tube 67. Then, the motor 56 is energized to move the block 52 rightwardly. The relationship between the array 12 and mark 83 and sensor 92 is such that the mark 83 will be sensed by the sensor 92 as an image of the left edge of the document 69 is focussed on the array 12 by the lenses 71 and 72. As the block 52 moves relative to the clock plate 81, the sensor 89 produces an X-clock pulse each time it senses one of the marks 82. These pulses are fed to the array 12. Each X-clock pulse causes the array 12 to self-scan and produce 32 Y-clock pulses in synchronism with respective output data signals from each of the photosensor elements. In other words, in response to each X-clock pulse the array 12 will produce 32 Y-clock pulses and data signals.

The mark 84 is sensed by the sensor 92 as the image of the right edge of the document 69 is focussed on the array 12. At this time, 1728 marks 82 have been sensed. In response to the signal produced by sensing the mark 84, the motor 56 is reversed to return the block 52 to the leftmost position. During this time or thereafter the rollers 73 and 74 are energized to move the document 69 downwardly by 4 mm. The block 52 is then driven rightwardly to scan the next 4 mm×216 mm area of the document 69. This process is continued until the entire document 69 has been scanned.

The arrangement shown in FIG. 3 is advantageous in that it precludes any positional scanning error due to variation in the speed of movement of the block 52, bending or slipping of the wire 59, etc. Each X-clock pulse produced by sensing a mark 82 corresponds in position to the mark 82. Thus, each subscan operation by the array 12 occurs at absolutely the correct position, which is the position of the mark 82.

The operation for reception is substantially identical to the operation for transmission except that the printing array 24 is energized for printing rather than the scanning array 12 being energized for scanning. The block 52 is initially moved to its leftmost position and the rollers 77 driven to position the upper 4 mm area of the paper 78 above the printing array 24. The block 52 is then moved rightwardly so that the printing array 24 moves under the surface of the paper 78 in engagement therewith. The mark 83 is sensed as the array 24 moves under the left edge of the paper 78. In response to the X-clock pulses produced by sensing the marks 82, the elements 24a of the array 24 are energized to induce an electrostatic charge pattern on the paper 78. In response to each X-clock pulse, the elements 24a are energized either in sequence or simultaneously to induce the charge pattern on the paper 78.

After the right edge of the paper 78 is reached and the mark 84 is sensed, the motor 56 is reversed to move the block 52 back to the leftmost position. Then, the rollers 77 are energized to move the paper 78 leftwardly by 4 mm to print the next 4 mm×216 mm area on the paper 78.

The printing elements 24a may be arranged either in a single row or in two or more rows, with the elements 24a in adjacent rows being alternatingly spaced along the axis 24b of the array 24. The array 24 may further comprise back electrodes (not shown) to produce an electric discharge in combination with the elements 24a.

FIGS. 2a to 2e illustrate a novel feature of the present invention. A facsimile reproduction 101 shown in FIG. 2a has an image area 101a and an upper white or blank margin area 101b. The present invention functions to automatically print characters representing the originating apparatus or the apparatus which transmits the facsimile or other video image data on the reproduction 101, shown in FIG. 2a in the upper blank margin 101b. Preferably, the character data includes the name and address of the transmitting facility. However, only the name "RICOH" is shown in the drawing for simplicity of illustration.

Figure 2B:
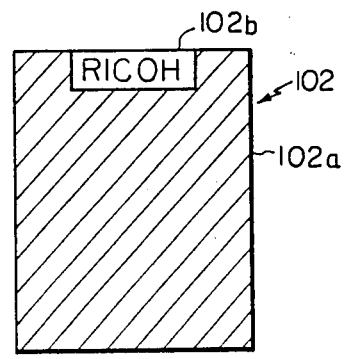

FIG. 2b shows a reproduction 102 having an image area 102a which covers the entire reproduction 102. In other words, there are no margins. In this case, the name "RICOH" is printed in the top center of the reproduction in a blank white area 102b.

Figure 2C:
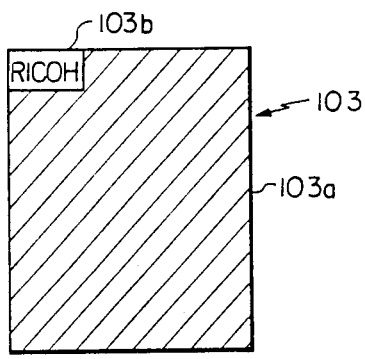

FIG. 2c is similar to FIG. 2b except that the name "RICOH" is printed in a blank area 103b at the upper left corner of an image area 103a of a reproduction 103.

Figure 2D:
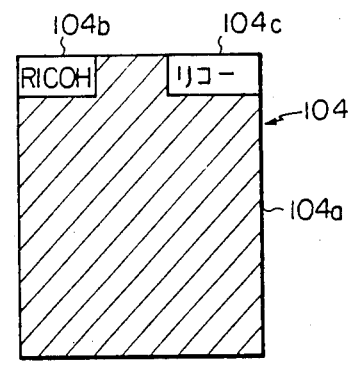

In FIG. 2d a reproduction 104 has an image area 104a but no margins. The name "RICOH" is printed in a blank area 104b at the upper left corner of the area 104a as in FIG. 2c. However, in FIG. 2d the name "RICOH" is printed again at the upper right corner of the area 104a, this time in Japanese kana characters " || コ ". A portion of the image area 104a is left between the areas 104b and 104c.

Figure 2E:
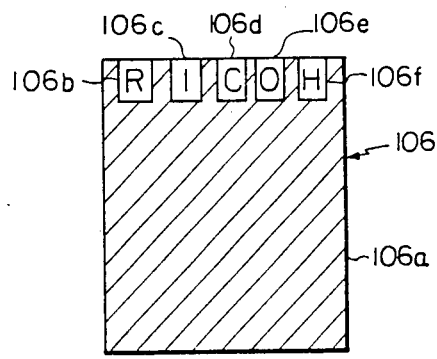

FIG. 2e shows yet another example of the present invention in which a reproduction 106 has an image area 106a but no margins. In this case the characters "R", "I", "C", "O" and "H" are printed in blank areas 106b, 106c, 106d, 106e and 106f respectively with portions of the image area 106a left therebetween.

Figure 9:
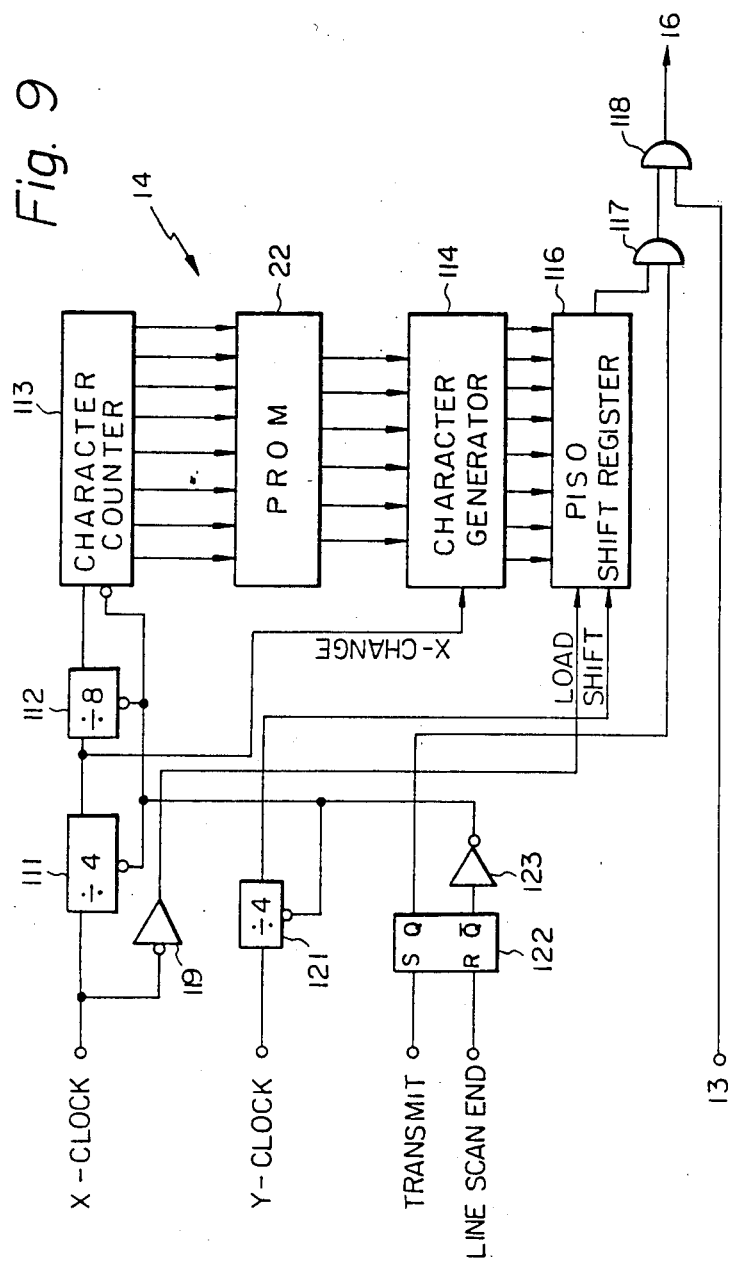
FIG. 9 is a block diagram of a first embodiment of the present apparatus.

FIG. 9 illustrates the internal components of the mixer 14 and also a code memory 22 which is connected to the mixer 14. The code memory 22 is preferably embodied by at least one read only memory such as a programmable read only memory (PROM) in the form of one or more integrated circuit chips.

The X-clock signals from the head 51 are fed through a frequency divider 111 which has a frequency division ratio of four and frequency divider 112 which has a frequency division ratio of eight to a count input of a character counter 113. Parallel outputs of the counter 113 are connected to parallel inputs of the PROM 22. Parallel outputs of the PROM 22 are connected to parallel inputs of a character generator 114. Parallel outputs of the character generator 114 are connected to parallel inputs of a parallel-to-serial converter, here shown as being embodied as a parallel-in, serial-out (PISO) shift register 116. The serial output of the shift register 116 is connected to an input of an AND gate 117, the output of which is connected to an input of an OR gate 118. The output of the OR gate 118 is connected to an input of the compressor 16. The other input of the OR qate 118 is connected to receive the data signals from the video amplifier 13.

The X-clock signals from the head 51 are also applied through an inverter 119 to a parallel load input of the shift register 116.

The Y-clock pulses from the head 51 are applied through a frequency divider 121 having a frequency division ratio of four to a serial shift input of the shift register 116. The output of the frequency divider 111 is also connected to an X-change input of the character generator 114.

A transmit signal from a general control unit (not shown) of the apparatus 11 is applied to a set input of a set-reset flip-flop 122. A line scan end pulse generated by the head 51 upon sensing the mark 84 is applied to a reset input of the flip-flop 122. The Q-output of the flip-flop 122 is connected to an input of the AND gate 117. The Q̄ output of the flip-flop 122 is connected through an inverter 123 to inverting reset inputs of the frequency dividers 111, 112 and 121 and the character counter 113.

Figure 7:
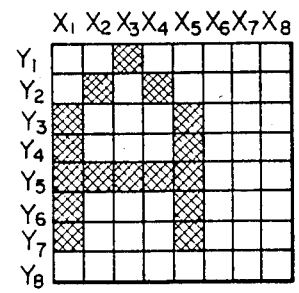
FIG. 7 is a graph illustrating a character as transmitted by the apparatus.
Figure 8:
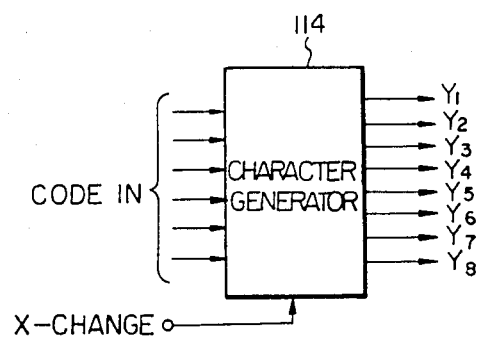
FIG. 8 is a block diagram of a character generator of the apparatus.

The character generator 114 is of the type used in dot matrix printers and is shown in more detail in FIG. 8. The character generator 114 is constructed to generate characters in an 8×8 matrix as illustrated in FIG. 7 and comprises an internal X-counter which is not shown but is incremented by the X-change pulses from the frequency divider 111.

The PROM 22 stores the characters which constitute the name, address or the like of the transmitting apparatus 11 in the form of character code signals having for example six bits each. The character code signals are stored in successive memory locations in the PROM 22. Incrementation of the character counter 113 causes the successive memory locations in the PROM 22 to be addressed and the bits of the code signals applied in parallel to the inputs of the character generator 114. Where the character "A" as shown in FIG. 7 is to be printed, the six bit character code stored in the PROM 22 representing the character "A" will be applied to the character generator 114.

Depending on the count in the internal X-counter, the character generator 114 will generate a single column or vertical line of the character. Where the count is zero corresponding to a horizontal (X) position X1, the character generator 114 will generate the first vertical line Y1 to Y8 of the character. In the case of the character "A", the outputs Y1 to Y8 will be 0, 0, 1, 1, 1, 1, 1 and 0 respectively. In response to an X-change pulse the internal X-counter will be incremented to the count of 1 and the character generator 114 will generate the next vertical line X2. The outputs Y1 to Y8 will be 0, 1, 0, 0, 1, 0, 0 and 0 respectively. In response to a 7th X-change pulse the internal counter will be incremented to the count of 7 and the X8 column or line output. The outputs Y1 to Y8 will all be zero.

The operation of the embodiment of FIG. 9 will now be described, assuming for simplicity of description that the frequency dividers 111 and 121 are omitted and that the frequency divider 112 and character counter 113 are reset.

The transmit signal sets the flip-flop 122, the high Q output of which enables the AND gate 117. The count in the character counter 113 is zero and the first memory location in the PROM 22 is addressed thereby. The code for the first character to be printed by the receiving apparatus is read out of the PROM 22 and applied to the character generator 114. The count in the internal X-counter of the character generator 114 is zero so the character generator 114 generates the leftmost vertical line of the first character.

The rising edge of the first X-clock signal is inverted by the inverter 119 to produce a falling edge which is applied to the shift register 116 causing the same to load the first line of the character. The rising edge of the first X-clock pulse increments the internal counter of the character generator 114 causing the character generator 114 to output the next vertical line of the first character. However, this does not affect the shift register 116 since the first line has already been loaded therein.

The first set of 8 Y-clock pulses is applied to the shift register 116 and causes the first line of the character to be serially shifted out of the shift register 116 through the AND gate 117 and OR gate 118 and applied to the compressor 16 for transmission. The character signals from the shift register 116 are logically added to the data signals from the video amplifier 13. The embodiment of FIG. 9 is suited for original document transmission in which an upper margin is provided. Thus, the data mixed with the character signals will all be logically low, and the transmitted data will consist effectively of only the character signals. The first line of character signals is received at the remote receiving apparatus (not shown) which reproduces the first vertical line of the first character in response thereto.

The rising edge of the second X-clock pulse is inverted by the inverter 119 and causes the second vertical character line to be loaded into the shift register 116. The internal counter in the character generator 114 is incremented to cause the character generator 114 to output the third vertical character line. The next 8 Y-clock pulses cause the second vertical line to be shifted out of the shift register 116 and transmitted. This operation is continued until the eight lines constituting the first character have been generated and transmitted.

In response to the rising edge of the 8th X-clock pulse the frequency divider 112 produces an output which increments the character counter 113. This causes the second memory location in the PROM 22 to be addressed and the code for the second character to be applied to the character generator 114. The 8 vertical lines of the second character are generated and output in response to the next 8 X-clock pulses. The character counter 113 is incremented in response to each 8 X-clock pulses to address a successive memory location in the PROM 22 and generate a new character.

The arrangement described thus far, with the frequency dividers 111 and 121 omitted, will print 216 characters, each having a height of 1 mm and a width of 1 mm. It will be recalled that the head 51 produces 32 Y-clock pulses for each X-clock pulse. Thus, after the first 8 Y-clock pulses are produced and the first vertical line of character data shifted out of the shift register 116, logically low signals will be shifted out of the shift register 116 in response to the next 24 Y-clock pulses. This occurs for each vertical line. As a result, the characters will be printed in only the upper 1 mm of the first scan area although the height of the first scan area is 4 mm. Not only does this constitute a waste of space in the uppermost scan area, but characters only 1 mm in size are difficult if not impossible to read with the naked eye. In other words, the characters are too small.

The obvious solution to this problem would be to provide a character generator which produces a 32×32 character, thus using all available space in the upper scan area and increasing the size of the characters by a factor of four. Characters having a size of 4 mm×4 mm are quite legible. However, this obvious expedient would unnecessarily increase the complexity and cost of the apparatus.

Figure 10:
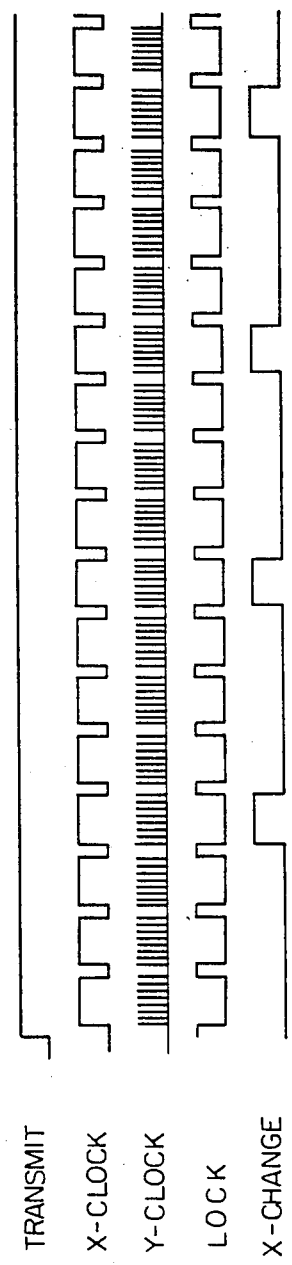
FIG. 10 is a timing diagram of the embodiment of FIG. 9.

The novel solution to this problem in accordance with the present invention is afforded by the frequency dividers 111 and 121. A timing diagram of the embodiment of FIG. 9, as illustrated, is provided in FIG. 10.

The frequency divider 121 divides the frequency of the Y-clock pulses by a factor of four. Thus, one shift pulse is applied to the shift register 116 in response to four Y-clock pulses. As a result, each bit of each vertical character line appears at the output of the shift register 116 in synchronism with 4 successive Y-clock pulses. In other words, each bit of each character line is transmitted in synchronism with four Y-clock pulses and printed as a vertical line having a length equivalent to four bits by the receiving apparatus. This serves to increase the vertical size of the characters by a factor of four.

The X-clock pulses are frequency divided by the divider 111 and applied to the character generator 114 as X-change pulses. These pulses cause the character generator 114 to generate successive vertical character lines. However, only one X-change pulse is applied to the character generator 114 for each 4 X-clock pulses. Thus, each character line is loaded into the shift register 116 four times in response to the inverted X-clock pulses from the inverter 119 and shifted out four times in synchronism with the frequency divided Y-clock pulses. This has the effect of printing each vertical character line four times in succession and increases the horizontal size of the characters by a factor of four. It will be understood that each character bit will be printed 16 times in 16 neighboring locations on the facsimile copy, four vertical locations and four horizontal locations.

This arrangement allows a maximum of 54 characters to be printed, each having a highly legible size of 4 mm×4 mm. The line scan end signal produced by sensing the mark 84 resets the flip-flop 22. The low Q output of the flip-flop 122 inhibits the AND gate 117 to prevent character data from being transmitted. The high $\overline{Q}$ output of the flip-flop 122 is fed through the inverter 123 to reset the frequency dividers 111, 121 and 112 and the character counter 113.

The character generator 114 is of the type used in dot matrix printers using wire elements and generates an 8×8 matrix. Use of the character generator 114 without the provision of the frequency dividers 111 and 121 would produce characters too small to be legible in the present apparatus 11 although of legible size in an impact printer. However, the frequency dividers 111 and 121 increase the size of the characters by a factor of four making them highly legible. Thus, an inexpensive character generator for a dot matrix impact printer may be used and still produce the desired results.

This arrangement also greatly increases the reliability of transmission of the character signals since each character line bit is transmitted as four sets of four signals each. Whereas the possibility of a single bit being lost due to transmission noise or the like is relatively high, the possibility of four successive bits being lost is extremely low. Thus, the character signals are transmitted with extremely high reliability as compared to a system in which each bit is only transmitted once.

FIG. 11 illustrates another mixer embodying the present invention which is generally designated as 131 and comprises a set-reset flip-flop 132. The transmit and line scan end signals are applied to set and reset inputs of the flip-flop 132. The Q output of the flip-flop 132 is connected to an input of an AND gate 133, the output of which is connected to inverting reset inputs of a Y-counter 134, an X-counter 136 and a character counter 137. A movable contact of a single-pole, double throw switch 138 is selectively engageable with a positive DC source +V through a resistor 139 connected to one fixed contact of the switch 138 or with another fixed contact of the switch 138 which is connected to receive a code control signal. The movable contact of the switch 138 is connected to another input of the AND gate 133.

The Y-clock pulses are fed through frequency dividers 141 and 142, each having a frequency division ratio of two, to an input of an AND gate 143. The output of the frequency divider 141 is connected to an input of an AND gate 144. The outputs of the AND gates 143 and 144 are connected to inputs of an OR gate 146, the output of which is connected to a count input of the counter 134.

The X-clock pulses are fed through frequency dividers 147 and 148, each having a frequency division ratio of two, to an input of an AND gate 149. The output of the frequency divider 147 is connected to an input of an AND gate 151. The outputs of the AND gates 149 and 151 are connected to inputs of an OR gate 152, the output of which is connected to a count input of the counter 136.

A single-pole, double-throw switch 153 has a movable contact which is selectively engageable with fixed contacts connected to ground and to the source +V through a resistor 154 respectively. The movable contact of the switch 153 is connected to inputs of the AND gates 143 and 149 and to inputs of the AND gates 144 and 151 through inverters 153 and 154 respectively.

The Y-counter 134 has count outputs connected in parallel to a multiplexer 156. The Y-counter 134 further has a $2^3$ bit output which is connected to an input of a NAND gate 157, another input of the NAND gate 157 being connected to the movable contact of the switch 153 through an inverter 158. The output of the NAND gate 157 is connected to an input of a NAND gate 159, the output of which is connected to an input of an AND gate 160 and through an inverter 162 to an input of an AND gate 161. Outputs of the AND gates 160 and 161 are connected to inputs of an OR gate 163, the output of which is connected to the compressor 16.

The X-counter 136 has count outputs connected in parallel to inputs of a character generator 164 and a carry output connected to a count input of the character counter 137. The character generator 164 generates an $8 \times 8$ character matrix and has eight outputs connected in parallel to the multiplexer 156.

The character counter 137 has outputs connected in parallel to inputs of a memory unit 166. The memory unit 116 has parallel outputs connected to inputs of the character generator 164. Parallel outputs of the memory unit 166 are also connected to inputs of a NAND gate 167, the output of which is connected to an input of the NAND gate 159. The data from the video amplifier 13 is applied to another input of the AND gate 160. The serial output of the multiplexer 156 is connected to an input of the AND gate 161.

The operation of the apparatus of FIG. 11 will now be described with reference being made also to FIG. 13. It will be assumed that the movable contacts of the switches 138 and 154 are connected through the resistors 139 and 154 to the source +V, thus applying logically high inputs to the AND gates 133, 143 and 149 enabling the same. The AND gates 144 and 151 are inhibited by the inverted high signal at the movable contact of the switch 153. In this manner, the output of the frequency divider 142 is applied to the count input of the Y-counter 134 through the AND gate 143 and OR gate 146 and the output of the frequency divider 148 is applied to the count input of the X-counter 136 through the AND gate 149 and OR gate 152.

With the count in the Y-counter initially zero, the $2^{30}$ output is low. This causes the NAND gate 157 to produce a high output. It will also be assumed that the first character stored in the memory unit 166 is not a blank character, and that at least one input to the NAND gate 167 is logically low. This causes the NAND gate 167 to produce a high output. The two high inputs to the NAND gate 159 cause the gate 159 to produce a low output which enables the AND gate 161 and inhibits the AND gate 160. Thus, data signals are blocked from passing through the AND gate 160 but character signals are enabled to pass through the AND gate 161.

The Y-clock pulses are frequency divided by a factor of four by the frequency dividers 141 and 142 and applied to the Y-counter 134. In accordance with the count in the Y-counter 134, the multiplexer 156 gates one bit of one vertical line of a character from the character generator unit 164 to the AND gate 161 for transmission. For example, if the count in the Y-counter 134 is zero, the uppermost or Y1 bit in a character line will be gated through the multiplexer 156 to the AND gate 161. If the count in the Y-counter 134 is seven, the lowermost or Y8 bit in the character line will be output by the multiplexer 156. Frequency divided Y-clock pulses appearing at the output of the OR gate 146 are designated as Y-change pulses.

The X-clock pulses are frequency divided by the frequency dividers 147 and 148 by a factor of four and gated through the AND gate 149 and OR gate 152 as X-change pulses which are counted by the X-counter 136. In accordance with the count in the X-counter 136, the vertical character lines are sequentially output by the character generator unit 164. The X-counter 136 serves the same function as the internal (not shown) X-counter in the character generator 114 of the mixer 14. It will also be understood that the multiplexer 156 serves the function of the shift register 116 of the mixer 14. However, the function served by the inverter 119 in the mixer 14 is not required in the mixer 131 since it is not required to load the vertical character lines into the multiplexer 156 four times each.

The X-counter 136 produces a carry signal which constitutes a character change signal in response to eight X-change signals. The character change signal increments the character counter 137 which addresses successive memory locations in the memory unit 166 in accordance with the address in the character counter 137. In this regard, the X-counter 136 serves the function of the frequency divider 112 in the mixer 114.

In summary, the memory unit 166 produces codes designating the desired characters for printing at the remote receiver in accordance with the count in the character counter 137. The character counter 137 is incremented by carry signals from the X-counter 136 which designates the vertical line of the character to be generated in accordance with the character code input to the character generator unit 164. The character counter 137 is incremented each time eight X-change signals are produced and the eight lines of a particular character are generated. The X-change signals are constituted by the X-clock signals frequency divided by a factor of four so that each vertical character line will be output four times, enlarging the horizontal character size by a factor of four. The individual bits of the vertical character lines are output from the character generator 164 through the multiplexer 156 in response to the Y-change signals which are constituted by the Y-clock signals frequency divided by a factor of four. Thus, each bit of each vertical character line will be output four times in synchronism with four successive Y-clock signals. This increases the vertical size of the characters by a factor of four.

The mixer 131 provides means for varying the enlargement ratio of the characters. The enlargement ratio may be changed from a factor of four to a factor of two merely by changing the switch 153 over so that the movable contact thereof is connected to ground. This enables the AND gates 144 and 151 and inhibits the AND gates 143 and 149. Thus, the outputs of the frequency dividers 141 and 147 are applied to the inputs of the counters 134 and 136 respectively. Since the Y-clock and X-clock pulses are only frequency divided by a factor of two, the enlargement ratio will be reduced from four to two.

With the switch 153 connected to ground the inverter 158 applies a high signal to the NAND gate 157. As long as the $2^3$ output of the Y-counter 134 is low, the NAND gate 157 will produce a high output and the NAND gate 159 will produce a low output to enable the AND gate 161 and inhibit the AND gate 160. However, after eight X-change pulses are received by the Y-counter 134, the $2^3$ output of the counter 134 will go high and the NAND gate 157 will produce a low output. This causes the NAND gate 159 to produce a high output which inhibits the AND gate 161 and enables the AND gate 160. As a result, the output of the multiplexer 156 is blocked by the AND gate 161 while data signals are gated through the AND gate 160.

Since the enlargement ratio in this case is only two, the height of the characters will be only 2 mm. If it were not for the provision of the NAND gates 157 and 159 the count in the $2^0$, $2^1$ and $2^2$ bits of the Y-counter 134 would repeat in response to the second eight Y-change pulses and the characters would be printed again in the second 2 mm vertical area of the reproduction. The NAND gates 157 and 159, however, not only serve to automatically prevent this double printing but also to gate the data signals to the compressor 16 in this area.

This feature is especially useful for documents containing no upper margin area, since it allows the entire image area which is not occupied by the identification characters to be used. Where the enlargement ratio of the characters is two, the characters occupy the upper 2 mm of the reproduction and the video image data occupies the rest of the reproducction including the 2 mm area directly below the characters. Thus, there is no waste of image area.

It will be noted that the mixer 14 functions to logically add, via the OR gate 118, the character code signals and the data signals. This is satisfactory as long as the document to be reproduced is provided with an upper margin area. However, it is not satisfactory where there is no upper margin area and the image may contain dark areas in the upper portion thereof. With dark characters superimposed on dark image areas, it is likely that the characters would be illegible.

The mixer 131 is useful for any type of document since data transmission is automatically inhibited during transmission of the character code data. As illustrated in FIGS. 2b to 2e, each character is printed in a 4 mm (or 2 mm) white block on the reproduction. Adjacent character areas produce a white horizontal strip on which the characters are printed. The black characters printed on a white background are perfectly legible.

It is often desired to transmit facsimile images of a plurality of pages or a set of documents sequentially. For example, it may be desired to successively transmit the pages of a manuscript. The switch 138 provides means for printing the identification character code data either on the reproduction of only the first document or on the reproduction of all of the documents of the set. For printing the characters on each reproduction, the switch 138 is connected to the source +V as shown. For printing the characters on only the first reproduction (or on only the second or other reproduction, etc.) the switch 138 is changed over to connect the code control signal to the AND gate 133.

Assuming that the characters are to be printed on only the first reproduction, the code control signal is made initially high, enabling the AND gate 133. After transmitting the character signals and data signals for the first document, the code control signal is made low. The AND gate 133 produces a low output which resets the counters 134, 136 and 137 to disable the mixer 131.

It will be further understood that the output of the AND gate 133 is connected to an input of the NAND gate 159. The output of the AND gate 133 goes low when the flip-flop 132 is reset by the line scan end signal. The low output of the AND gate 133 causes the NAND gate 159 to produce a high signal which enables the AND gate 160 and inhibits the AND gate 161. This causes data signals to be transmitted after the characters have been transmitted.

The output of the AND gate 133 will remain low even in response to the transmit signal for the next document since the output of the switch 138 is low. This prevents the characters from being transmitted for the second and succeeding documents.

The switch 138 and resistor 139 constitute a code control unit 168 which may be replaced by a code control unit 169 illustrated in FIG. 12. The code control unit 169 consists of a set-reset flip-flop 170 having a $\overline{Q}$ output connected to an input of the AND gate 133. The set and reset inputs of the flip-flop 170 are connected to receive multi-page and start signals respectively.

A start signal is generated at the beginning of each transmission operation regardless of whether a one page document or multi-page document is to be transmitted. This resets the flip-flop 170 and enables the AND gate 133 for transmission of the characters in the manner described above. A switch (not shown) is provided which the operator sets to either a single page or a multi-page position. With the switch in the single page position, the flip-flop 170 remains reset and the characters are transmitted for every page or document. However, with the switch in the multi-page position a multi-page signal is generated at the beginning of the scanning of the second document which sets the flip-flop 170. This causes the output of the AND gate 133 to go low and prevent transmission of the characters for the second and succeeding document pages.

Figure 15:
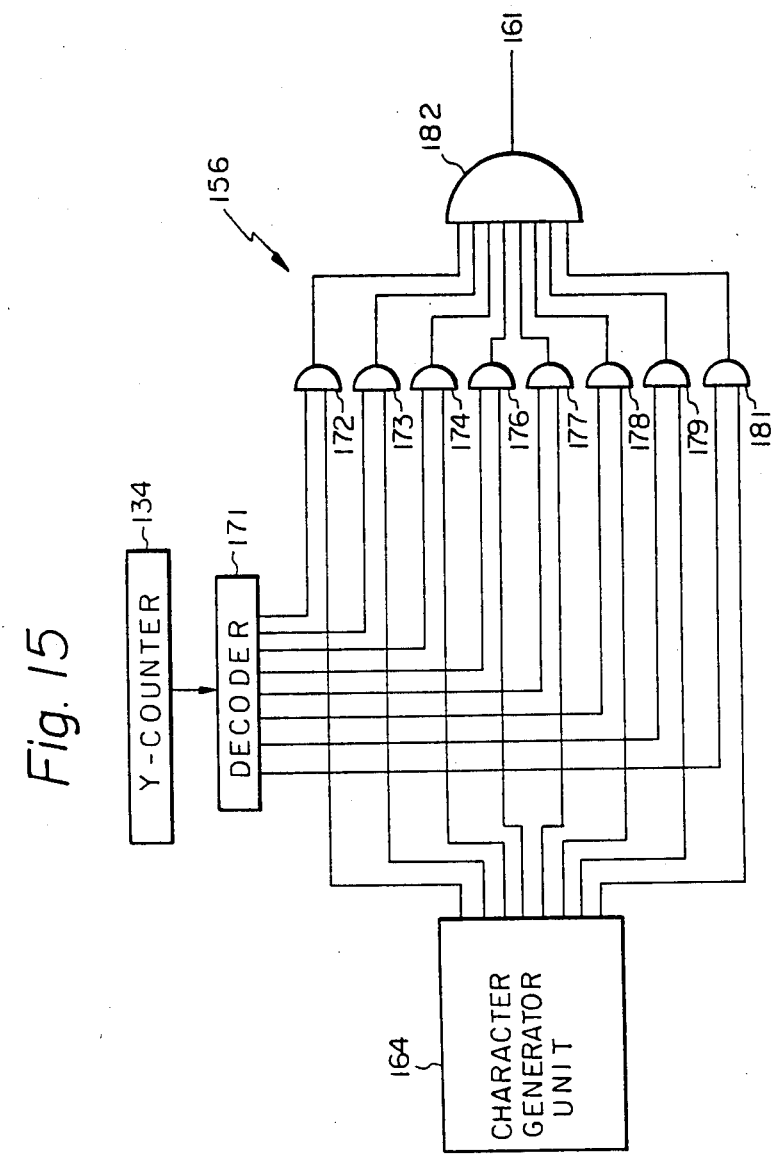
FIG. 15 is a block diagram of a multiplexer of the embodiment of FIG. 12.
Figure 16:
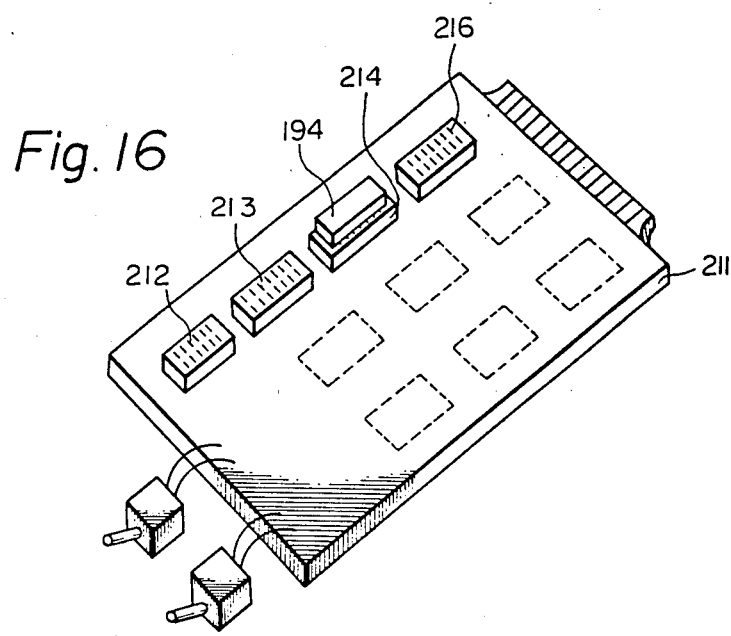
FIG. 16 is a diagrammatic perspective view illustrating a circuit board and integrated circuit memories in accordance with the present invention.

A schematic diagram of the multiplexer 156 is shown in FIG. 15. The outputs of the Y-counter 134 are connected in parallel to inputs of a decoder 171. The outputs of the decoder 171 are connected to inputs of AND gates 172, 173, 174, 176, 177, 178, 179 and 181, the outputs of which are connected through an OR gate 182 to the AND gate 161. The eight parallel outputs of the character generator unit 164 are connected to inputs of the AND gates 172 to 181 respectively.

The decoder 171 will produce high outputs to enable the AND gates 172 to 181 sequentially in accordance with the respective counts in the counter 134. When the count in the counter 134 is zero, the decoder 171 will produce a high output to enable only the AND gate 172 and gate the Y1 output of the character generator unit 164 to the OR gate 182. When the count in the counter 134 is seven, the decoder 171 will enable only the AND gate 181 to gate the Y8 output of the character generator unit 164 therethrough, etc.

Figure 14:
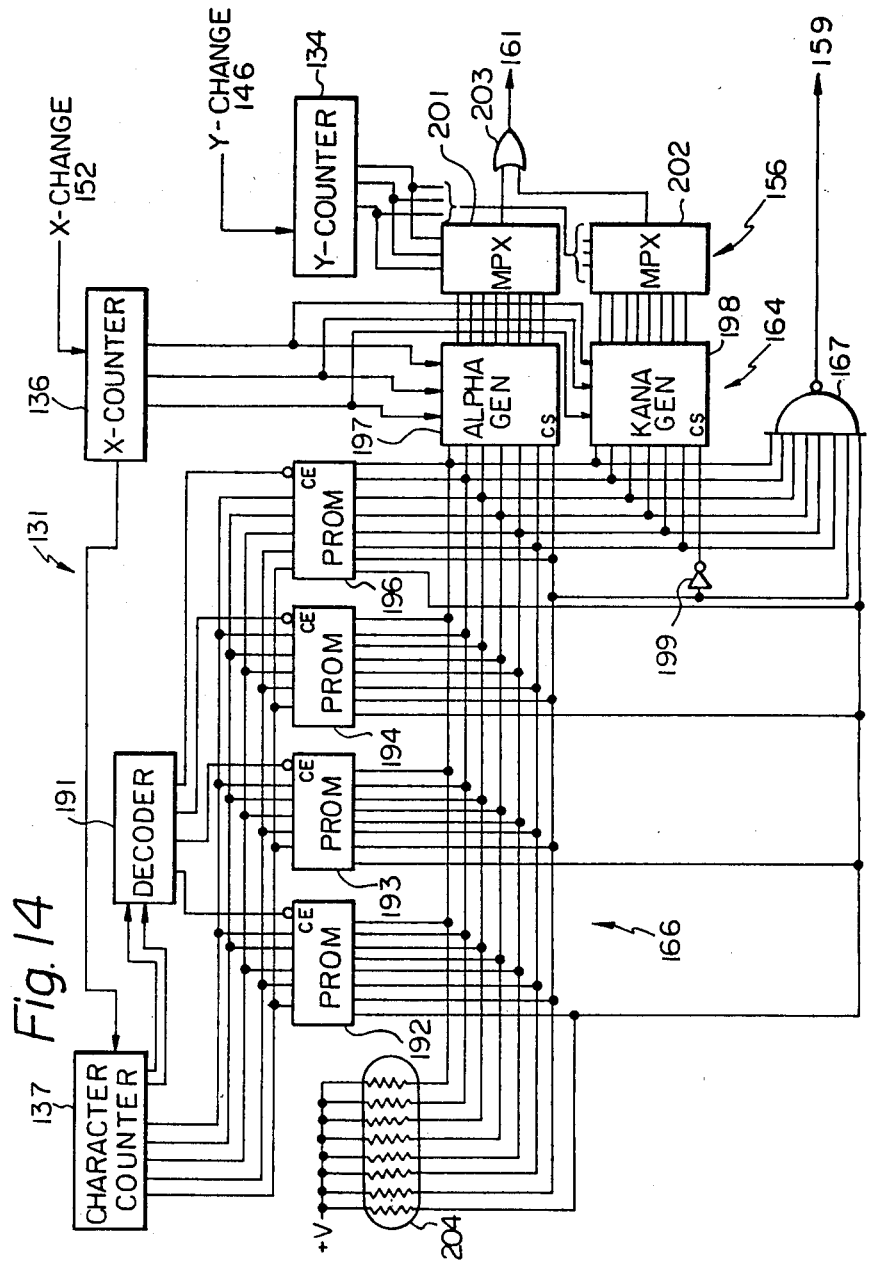
FIG. 14 is a block diagram illustrating various components of the embodiment of FIG. 12 in greater detail.

Various components of the mixer 131 are shown in greater detail in FIG. 14. The high order bit outputs of the character counter 137 are connected to inputs of a decoder 191. The low order bit outputs of the character counter 137 are connected in parallel to address inputs of PROMs 192, 193, 194 and 196 which constitute the memory unit 166 in combination with the decoder 191. The outputs of the decoder 191 are connected to chip enable inputs of the PROMs 192, 193, 194 and 196 respectively.

Figure 17:
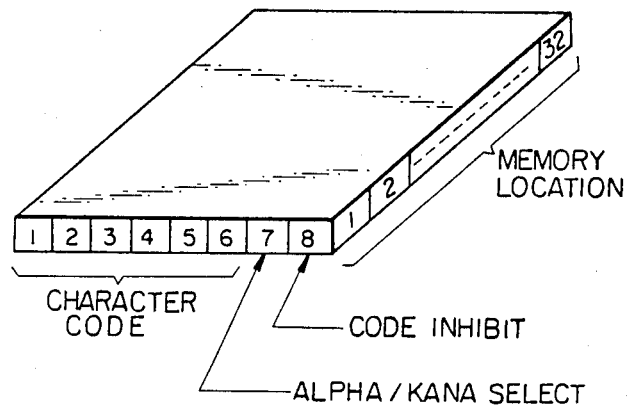
FIG. 17 is a diagram illustrating the organization of data in the memories.

As shown symbolically in FIG. 17, each code stored in the PROMs 192, 193, 194 and 196 includes a six bit character code portion, an alpha/kana select bit and a code inhibit bit. The code bit outputs of the PROMs 192, 193, 194 and 196 are contacted in parallel to code inputs of alphanumeric and kana character generators 197 and 198 respectively. The alpha/kana select bit outputs of the PROMs 192, 193, 194 and 196 are connected in parallel to a chip select input of the alpha generator 197 and through an inverter 199 to a chip select input of the kana generator 198. All eight outputs of the PROMs 192, 193, 194 and 196 are connected in parallel to inputs of the NAND gate 167.

The outputs of the alpha generator 197 are connected to inputs of a multiplexer 201. The outputs of the kana generator 164 are connected to inputs of a multiplexer 202. The outputs of the multiplexers 201 and 202 are connected to inputs of an OR gate 203, the output of which is connected to the AND gate 161. The outputs of the Y-counter 134 are connected in parallel to vertical bit select inputs of the multiplexers 201 and 202 in the manner described above. The outputs of the X-counter 136 are connected in parallel to line select inputs of the character generators 197 and 198. A pull-up resistor group 204 comprises eight pull-up resistors (not individually designated) connected between the source +V and the outputs of the PROMs 192, 193, 194 and 196 as illustrated.

The alphanumeric generator 197 is constructed to generate alphanumeric characters and symbols. The kana generator 198 is constructed to generate Japanese katakana and hiragana phonetic alphabets. Naturally, the kana generator 198 may be replaced by a character generator constructed to generate any desired type of alphabet such as Arabic.

The PROMs 192, 193, 194 and 196 are each designed to store the codes for one-fourth of the horizontal line of characters. The PROM 192 stores the codes for the leftmost characters, etc. The PROMs 192, 193, 194 and 196 are sequentially enabled by the decoder 191 as determined by the high order bit outputs of the character counter 137. The individual addresses in the PROMs 192, 193, 194 and 196 are determined by the low order bit outputs of the character counter 137. Due to this bus arrangement, each count in the character counter 137 will address a discrete memory location in one of the PROMs 192, 193, 194 and 196.

The 7th bit of each code stored in the PROMs 192, 193, 194 and 196 indicates whether the character is alphanumeric or kana. When the 7th bit is logically high the alphanumeric generator 197 is enabled and outputs the character lines through the multiplexer 201. When the 7th bit is logically low, the kana generator 198 is enabled and outputs the character lines through the multiplexer 202. The character generators 197 and 198 as well as the multiplexers 201 and 202 are controlled by the X-change pulses and Y-change pulses in the manner described above.

The NAND gate 167 will produce a low output to prevent transmission of character data and enable transmission of video data when all of the outputs of the addressed location in the PROM 192, 193, 194 or 196 are logically high. This allows either a blank space or video data to be provided between adjacent characters. Where a blank space is desired, an appropriate code other than 11111111 is stored in the PROM 192, 193 or 196 at the proper location. To fill the space with video data, the code 11111111 is stored, causing the NAND gate 167 to produce a low output which inhibits the AND gate 161 and enables the AND gate 160.

In accordance with an important feature of the present invention, the PROMs 192, 193, 194 and 196 store the character codes in the same positions in which the characters are transmitted and reproduced by the receiving apparatus. The PROMs 192, 193, 194 and 196 are detachably mounted on a circuit board 211 by means of integrated circuit sockets 212, 213, 214 and 216 respectively. Where the PROM 192 is plugged in the socket 212, the character codes stored in the PROM 192 will produce printed characters in the leftmost one-fourth of the printed character area in the reproduction. The PROM 194 plugged into the socket 214, as illustrated, will produce printed characters in the third one-fourth of the reproduction measured from left to right. This makes it easy to provide the character data at any desired place in the printed area.

The pull-up resistor group 204 enables video image data to be provided in areas of the reproduction where one or more of the PROMs 192, 193, 194 and 196 are absent.

In such a case, when the memory locations in the absent PROM 192, 193, 194 or 196 are addressed, all of the output lines will be logically high due to the connection of the pull-up resistor group 204. This will cause the NAND gate 167 to produce a low output and cause transmission of video data in the same manner as when a code 11111111 is stored in a memory location. This maximizes the image area on the reproduction by printing the identification characters only in the areas in which they are actually desired.

In summary, it will be seen that the present invention provides numerous advantages. A line of characters indicating the name, address or the like of a transmitting facility can be transmitted without troublesome writing on an original document and without special circuitry at the receiving apparatus and be automatically printed on the reproduction. A low cost character generator for a dot matrix impact printer can be used since the characters are enlarged in size in a novel manner. Since each dot of each character is transmitted four times in succession, data loss is minimized. The character codes are stored in detachable integrated circuit memories and can be changed easily. The entire image area except for the areas in which the characters are actually printed is available for use.

Various modifications will become possible for those skilled in the art after receiving the teachings of the present disclosure without departing from the scope thereof. For example, although the scanning array has been described as comprising only one row of photosensor elements, it may be adapted to comprise two or more rows of photosensor elements arranged either in a rectangular or zig-zag configuration. As another modification, the axes of the scanning and printing arrays may be oriented at an angle other than 90° to the direction of movement thereof, or be skewed relative to the edges of the document and paper. As another modification, the servo motor 56 may be replaced by a pulse motor and suitable drive circuitry.

Although the present invention has been shown and described as providing only one line of printed characters, it is well within the scope of this invention to provide two or more lines of characters. It is also possible to provide the character enlarging means at the receiver rather than at the transmitter for the purpose of reducing transmission time.

What is claimed is:

1. A video data transmission apparatus including scanning means for producing electrical data signals representing a visual image and transmission means for transmitting the data signals, characterized by comprising:

memory means for storing character code signals; and mixing means for reading the code signals out of the memory means, generating character dot signals corresponding to the character codes in a same line scan format as the data signals and mixing the character dot signals with the data signals for transmission by the transmission means as a single integral image.

2. An apparatus as in claim 1, in which the mixing means is constructed to logically sum the character dot signal with the data signals.

3. An apparatus as in claim 1, in which the mixing means is constructed to block the data signals while passing the character dot signals to the transmission means.

4. An apparatus as in claim 1, in which the memory means comprises a plurality of memories.

5. An apparatus as in claim 4, in which the memory means further comprises a circuit board, the memories being detachably mounted on the circuit board.

6. An apparatus as in claim 5, in which the memory means is constructed so that positions of the memories on the circuit board correspond to positions of the code signals stored in the respective memories as transmitted by the transmission means.

7. An apparatus as in claim 3, in which the mixing means is further constructed to, in response to a predetermined code signal from the memory means, block the corresponding character dot signals while passing the data signals to the transmission means.

8. A video data transmission apparatus including scanning means for producing electrical data signals representing a visual image and transmission means for transmitting the data signals, characterized by comprising:

memory means for storing character code signals; and mixing means for reading the code signals out of the memory means, generating character dot signals corresponding to the character codes in a same form as the data signals and mixing the character dot signals with the data signals for transmission by the transmission means as a single integral image;

the mixing means being constructed to block the data signals while passing the character dot signals to the transmission means;

the memory means comprising a circuit board and a plurality of memories detachably mounted on the circuit board, the mixing means being further constructed to, in response to sensing absence of a memory on the circuit board, block the character dot signals while passing the data signals to the transmission means.

9. A video data transmission apparatus including scanning means for producing electrical data signals representing a visual image and transmission means for transmitting the data signals, characterized by comprising:

memory means for storing character code signals;

mixing means for reading the code signals out of the memory means, generating character dot signals corresponding to the character codes in a same form as the data signals and mixing the character dot signals with the data signals for transmission by the transmission means;

the mixing means being constructed to block the data signals while passing the character dot signals to the transmission means;

the memory means comprising a circuit board and a plurality of memories detachably mounted on the circuit board, the mixing means being further constructed to, in response to sensing absence of a memory on the circuit board, block the character dot signals while passing the data signals to the transmission means; and a power source, each of the memories having a plurality of outputs and pull-up resistors connected between the respective outputs and the power source, the mixing means being constructed to sense absence of a memory when output voltages of all of the outputs of said memory are substantially equal to a voltage of the power source.

10. An apparatus as in claim 1, further comprising means for enlarging a size of character corresponding to the code signals by controlling the transmission means to transmit each character dot signal a plurality of times.

11. An apparatus as in claim 10, in which the scanning means is constructed to scan the visual image and produce scan clock pulses for synchronizing scanning, the data signals being produced in synchronism with respective scan clock pulses, each character dot signal being transmitted a plurality of times in synchronism with a plurality of respective scan clock pulses.

12. An apparatus as in claim 1, in which the apparatus is constructed to sequentially scan a plurality of visual images and transmit data signals corresponding thereto, the apparatus further comprising control means for controlling the mixing means to selectively mix the character dot signals with only the data signals corresponding to one of the visual images or with the data signals corresponding to all of the visual images.

13. An apparatus as in claim 12, in which said one of the visual images is a first of the visual images.

14. A video data transmission apparatus including scanning means for producing electrical data signals representing a visual image and transmission means for transmitting the data signals, characterized by comprising:

memory means for storing character code signals; and mixing means for reading the code signals out of the memory means and mixing the code signals with the data signals for transmission by the transmission means as a single integral image;

the scanning means comprising a scanning array of photosensor elements extending in a first direction, scan drive means for moving the scanning array in a second direction which is perpendicular to the first direction and pulse generator means for producing first and second scan clock pulses, the first scan clock pulses causing the photosensor elements to sequentially produce respective data signals, the second scan clock pulses causing the scan drive means to move the scanning array in the second direction by one increment, one second scan clock pulse being produced after a number of first scan clock pulses equal to a number of the photosensor elements has been produced;

the mixing means comprising character generator means connected to an output of the memory means, a second scan clock pulse counter connected between the pulse generator means and the character generator means for counting the second scan clock pulses and causing the character generator means to generate successive lines of character signals extending in the first direction in response to respective counts in the second scan clock pulse generator and parallel-to-serial converter means connected between the character generator means and the transmission means for sequentially gating character signals of the lines of character signals therethrough in response to the first scan clock pulses.

15. An apparatus as in claim 14, in which the parallel-to-serial converter means comprises a first scan clock pulse counter for counting the first scan clock pulses and a multiplexer connected between the first scan clock pulse counter and the transmission means.

16. An apparatus as in claim 14, in which the parallel-to-serial converter means comprises a parallel-in, serial-out shift register having parallel inputs connected to parallel outputs of the character generator means and a serial output connected to an input of the transmission means, the shift register further having a shift input connected to receive the first scan clock pulses and a parallel load input connected to receive the second scan clock pulses.

17. An apparatus as in claim 14, further comprising a first frequency divider connected between the pulse generator means and the parallel-to-serial converter means for frequency dividing the first scan clock pulses and a second frequency divider connected between the pulse generator means and the character generator means for frequency dividing the second scan clock pulses.

18. An apparatus as in claim 17, in which the first and second frequency dividers have a same frequency division ratio.

19. An apparatus as in claim 17, in which the first and second frequency dividers have variable frequency division ratios.

20. An apparatus as in claim 14, in which the memory means is constructed to store character code signals representing a plurality of characters in successive memory locations, the mixing means further comprising character counter means for counting the second scan clock pulses and addressing a successive memory location in response to a number of second scan clock pulses equal to a number of character lines in the second direction.

21. An apparatus as in claim 1, in which the mixing means comprises first and second character generators connected in parallel with each other between the memory means and the transmission means, the code signals in the memory means comprising a first portion designating a character and a second portion designating the first or second character generator.

* * * * *